United States Patent
Allen et al.

(10) Patent No.: US 9,930,143 B2
(45) Date of Patent: *Mar. 27, 2018

(54) CLIENT SYSTEM COMMUNICATION WITH A MEMBER OF A CLUSTER OF SERVER SYSTEMS

(71) Applicant: International Business Machines Corporation, Armonk, NY (US)

(72) Inventors: Gerald M. W. Allen, Eastleigh (GB); Michael D. Brooks, Southampton (GB); Jenny J. He, Eastleigh (GB); Philip I. Wakelin, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/714,389

(22) Filed: May 18, 2015

(65) Prior Publication Data
US 2016/0072881 A1 Mar. 10, 2016

Related U.S. Application Data

(63) Continuation of application No. 14/482,184, filed on Sep. 10, 2014.

(51) Int. Cl.
*G06F 15/16* (2006.01)
*H04L 29/06* (2006.01)
(Continued)

(52) U.S. Cl.
CPC ............ *H04L 67/42* (2013.01); *H04L 47/125* (2013.01); *H04L 67/1008* (2013.01);
(Continued)

(58) Field of Classification Search
CPC .............................. H04L 67/42; H04L 47/125
(Continued)

(56) References Cited

U.S. PATENT DOCUMENTS

| 5,687,372 A | * | 11/1997 | Hotea | H04L 29/06 707/999.2 |
| 6,496,948 B1 | * | 12/2002 | Smorodinsky | G06F 9/505 709/221 |

(Continued)

FOREIGN PATENT DOCUMENTS

EP 1177666 B1 6/2002

OTHER PUBLICATIONS

Aversa, Luis, et al.; "Load Balancing a Cluster of Web Servers" Boston University. Copyright Date 2000.
(Continued)

*Primary Examiner* — Nicholas Taylor
*Assistant Examiner* — Meng Vang
(74) *Attorney, Agent, or Firm* — Edward J. Wixted, III

(57) ABSTRACT

In an approach for connecting an access point in a client region to an access point within a cluster of server regions for a transaction process, a processor receives a connect request to a cluster of server regions sharing a network end point from a client region. A processor reroutes the connect request by a connection balancing mechanism to a network end point corresponding to a server region within the cluster of server regions. A processor transmits connection information to the client region, wherein the connection information allows the client region to connect to the server region within the cluster of server regions. A processor connects the server region within the cluster of server regions to the client region.

6 Claims, 4 Drawing Sheets

(51) Int. Cl.
*H04L 29/08* (2006.01)
*H04L 12/803* (2013.01)

(52) U.S. Cl.
CPC ...... *H04L 67/1014* (2013.01); *H04L 67/1021* (2013.01); *H04L 67/1023* (2013.01); *H04L 67/141* (2013.01)

(58) Field of Classification Search
USPC ........................................................ 709/203
See application file for complete search history.

(56) References Cited

U.S. PATENT DOCUMENTS

| | | | |
|---|---|---|---|
| 7,003,575 B2 | 2/2006 | Ikonen | |
| 7,991,912 B2 | 8/2011 | Manapragada et al. | |
| 9,197,599 B1* | 11/2015 | Barry | G06F 11/0709 |
| 2002/0069279 A1* | 6/2002 | Romero | H04L 45/302 |
| | | | 709/225 |
| 2002/0120787 A1* | 8/2002 | Shapiro | G06F 9/5055 |
| | | | 719/311 |
| 2004/0203598 A1* | 10/2004 | Aerrabotu | G06Q 20/3674 |
| | | | 455/411 |
| 2005/0144531 A1* | 6/2005 | Challener | H04L 41/0654 |
| | | | 714/39 |
| 2011/0247053 A1* | 10/2011 | Pugh | H04L 63/1441 |
| | | | 726/4 |
| 2012/0192246 A1* | 7/2012 | Harrison | G06F 21/577 |
| | | | 726/1 |
| 2012/0259912 A1 | 10/2012 | Kruse et al. | |
| 2013/0066941 A1* | 3/2013 | Kruse | H04L 69/40 |
| | | | 709/203 |
| 2013/0174177 A1* | 7/2013 | Newton | H04L 67/1008 |
| | | | 718/105 |
| 2013/0336317 A1 | 12/2013 | Mithyantha et al. | |
| 2015/0046511 A1* | 2/2015 | Frerking | H04L 67/1034 |
| | | | 709/203 |

OTHER PUBLICATIONS

Grace Period Disclosure; IBM; "The IBM CICS Transaction Server for z/OS, v5.2 open beta offering takes service agility, operational efficiency, and cloud enablement to a new level"; IBM United States Software Announcement 214-015; Dated Jan. 21, 2014.
U.S. Appl. No. 14/482,184, filed Sep. 10, 2014; Entitled "Client System Communication With a Member of a Cluster of Server Systems".
Appendix P: List of IBM Patents or Patent Applications Treated as Related.

* cited by examiner

CLIENT SYSTEM COMMUNICATION WITH A MEMBER OF A CLUSTER OF SERVER SYSTEMS

STATEMENT REGARDING PRIOR DISCLOSURES BY THE INVENTOR OR A JOINT INVENTOR

Various aspects of the present invention have been disclosed by an inventor or a joint inventor in the product IBM® CICS® Transaction Server for z/OS® (CICS TS), V5.2 open beta, made publicly available on Feb. 14, 2014. This disclosure is submitted under 35 U.S.C. 102(b)(1)(A). The following documentation is provided in support.

(i) IBM; "The IBM CICS Transaction Server for z/OS, v5.2 open beta offering takes service agility, operational efficiency, and cloud enablement to a new level"; IBM United States Software Announcement 214-015; Dated Jan. 21, 2014.

FIELD OF THE INVENTION

The present invention relates generally to the field of transaction processing (TP) systems, and more particularly to communication between a client TP system and a member of a cluster of server TP systems.

BACKGROUND OF THE INVENTION

In computer science, transaction processing is information processing that is divided into individual, indivisible operations, called transactions. Each transaction must succeed or fail as a complete unit and cannot be only partially complete. Transaction processing is designed to maintain a system's integrity (typically a database or some modern filesystem) in a known, consistent state, by ensuring that interdependent operations on the system are either all completed successfully or all cancelled successfully.

For example, consider a typical banking transaction that involves moving $500 from a customer's savings account to a customer's checking account. This transaction involves at least two separate operations in computer terms: debiting the savings account by $500, and crediting the checking account by $500. If one operation succeeds but the other does not, the books of the bank will not balance at the end of the day. There must therefore be a way to ensure that either both operations succeed or both fail, so that there is never any inconsistency in the bank's database as a whole.

Transaction processing links multiple individual operations in a single, indivisible transaction, and ensures that either all operations in a transaction are completed without error, or none of them are. If some of the operations are completed but errors occur when the others are attempted, the transaction-processing system "rolls back" all of the operations of the transaction (including the successful ones), thereby erasing all traces of the transaction and restoring the system to the consistent, known state that the system was in before the processing of the transaction began. If all operations of a transaction are completed successfully, the transaction is committed by the system, and all changes to the database are made. Transaction processing guards against hardware and software errors that might leave a transaction partially completed. If the computer system crashes in the middle of a transaction, the transaction processing system guarantees that all operations in any uncommitted transactions are cancelled.

SUMMARY

Aspects of an embodiment of the present invention disclose a method, computer program product, and computing system for connecting an access point in a client region to an access point within a cluster of server regions for a transaction process. A processor receives a connect request to a cluster of server regions sharing a network end point from a client region. A processor reroutes the connect request by a connection balancing mechanism to a network end point corresponding to a server region within the cluster of server regions. A processor transmits connection information to the client region, wherein the connection information allows the client region to connect to the server region within the cluster of server regions. A processor connects the server region within the cluster of server regions to the client region.

DETAILED DESCRIPTION

A typical usage scenario when connecting transaction processing (TP) programs to other TP programs is that all connections between partners must be pre-defined with the network endpoint and unique TP identifier. This allows the security and connection properties to be tightly controlled, and is a prerequisite to the ability for TP requests to be routed between different TP servers in a cluster across multiple types of network hops. However, this causes a problem when there is not a one-to-one relationship between the network end point and the TP identifier, as is the case when a cluster of TP servers is listening on a shared TCPIP end point. A route from a client TP program to a server TP program that is listening on an end point, which is shared amongst others in a cluster, cannot be unambiguously identified (in that it cannot be predetermined) using the convention of a TP program's unique identifier concatenated with a network qualifier, because the identity of the individual server TP program in the cluster is not determined ahead of time.

In the present invention, a model connection definition is used to define a network end point identifier of a cluster. This is to allow a client TP program to send a request to connect to any particular server TP program in a cluster, using the cluster end point identifier. Once communication between client TP program and the particular server TP program within a cluster is established, the client TP program can complete population of its resource definitions, allowing conformance to the route identification scheme.

The present invention will now be described in detail with reference to the Figures.

Figure 1:
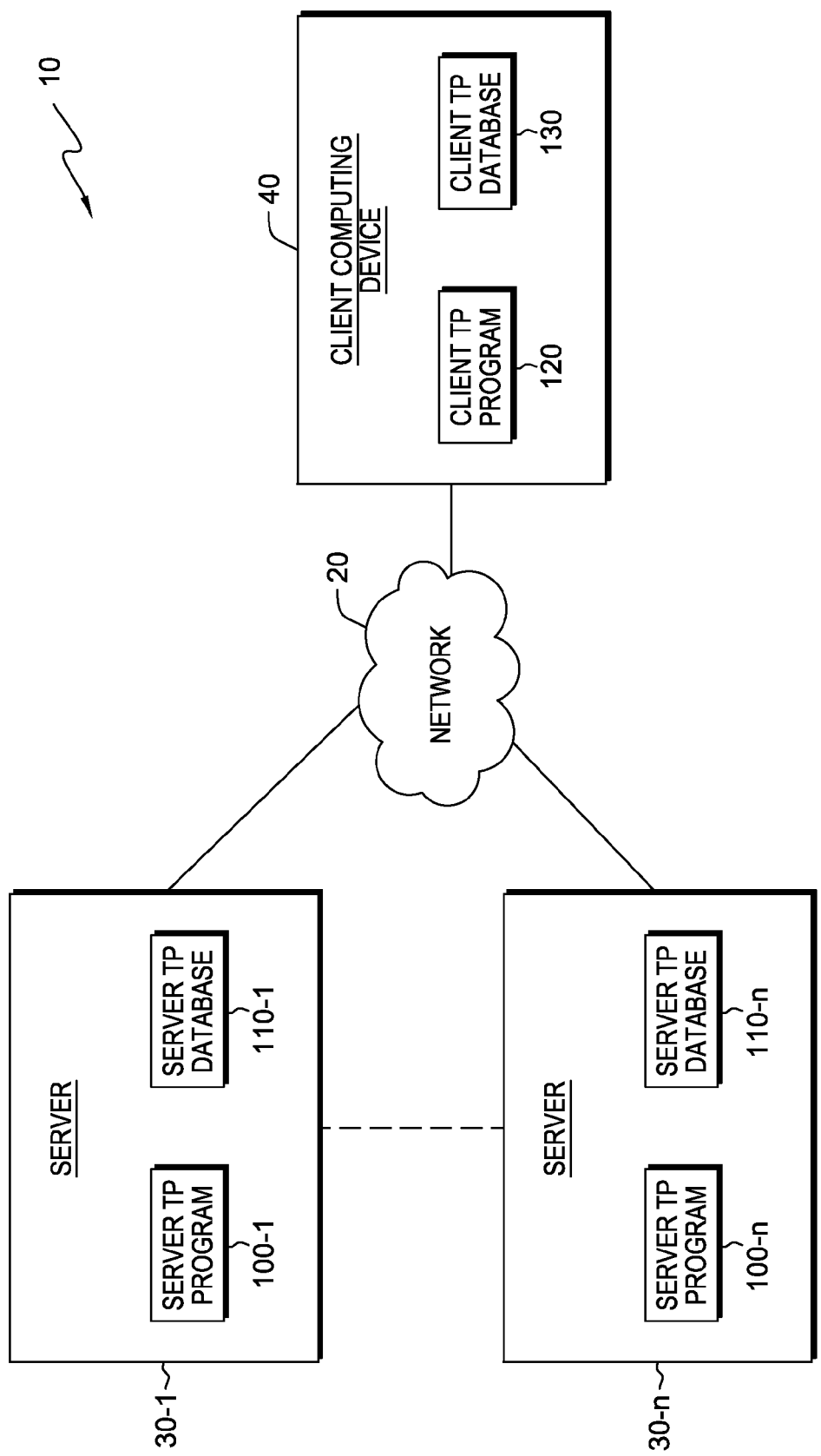
FIG. 1 depicts a diagram of a computing system, in accordance with an embodiment of the present invention.

FIG. 1 depicts a diagram of computing system 10, in accordance with one embodiment of the present invention. FIG. 1 provides an illustration of one embodiment and does not imply any limitations with regard to the environments in which different embodiments may be implemented.

In the depicted embodiment, server 30, server TP program 100, and server TP database 110 are all labeled as "1-n." This labeling is to signify there can be one server 30, server TP program 100, and server TP database 110 or any number of server 30, server TP program 100, and server TP database 110. Hereafter, server 30, server TP program 100, and server TP database 110 will signify any one specific server, server TP program, and server TP database within the collective server 30, server TP program 100, and server TP database 110, respectively, "1-n."

In the depicted embodiment, computing system 10 includes server 30 and client computing device 40 interconnected over network 20. Network 20 may be a local area network (LAN), a wide area network (WAN) such as the Internet, a cellular data network, any combination thereof, or any combination of connections and protocols that will support communications between server 30 and client computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with client computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. Server 30 contains server TP program 100 and server TP database 110. Server 30 may include components, as depicted and described in further detail with respect to FIG. 4.

Client computing device 40 may be a desktop computer, laptop computer, netbook computer, tablet computer, personal digital assistant (PDA), or smart phone. In general, client computing device 40 may be any electronic device or computing system capable of processing program instructions, sending and receiving data, and communicating with server 30 via network 20. Client computing device 40 contains client TP program 120 and client TP database 130. Client computing device 40 may include components, as depicted and described in further detail with respect to FIG. 4.

Client TP program 120 operates to retrieve data, such as data stored to client TP database 130, to communicate with server TP program 100 and establish a TP system to TP system connection. In some embodiments, client TP program 120 may use data that is written onto client TP program 120. In some embodiments, client TP program 120 may generate and forward unique TP identifiers, and other resource definitions, to a server device attempting to perform a transaction in hopes to obtain a secure connection between the client and server. In some embodiments, client TP program 120 may reject a TP system to TP system connection with a server TP program, such as server TP program 100. Client TP program 120 may reject a connection if the cluster returns any information that does not belong to a particular server TP 100. In some embodiments, client TP program 120 may accept, and establish, a TP system to TP system connection with a server TP program, such as server TP program 100. Client TP program 120 may accept, and establish, a connection if the cluster is able to return the specific information belonging to a particular server TP program 100. In some embodiments, client TP program 120 may be a program designed for a mobile device, such as a smart phone or tablet. In some embodiments, client TP program 120 may be a program designed for an automated teller machine (ATM). In other embodiments, client TP program 120 may be a program designed for a traditional computing device, such as a desktop computer, PC, or laptop. Hereafter, TP program and region will be used interchangeably. In general, client TP program 120 may be any application or software that enables a user at client computing device 40 to access server TP program 100 over network 20. In the depicted embodiment, client TP program 120 resides on client computing device 40. In other embodiments, client TP program 120 may reside on another client computing device capable of accessing server TP program 100 over network 20.

Client TP database 130 may be a repository that may be written and/or read by client TP program 120. In some embodiments, a program (not shown) may allow a web developer, administrator, or other user to define the data and write the defined data to client TP database 130. Data relevant to the communication of two TP programs, such as the communication between client TP program 120 and server TP program 100, may be stored to client TP database 130. For example, data relevant to the communication of two TP programs may include: a unique TP identifier, listening service definition, and model connection definition. In general, client TP database 130 may be any database capable of being monitored and accessed by client TP program 120.

A unique TP identifier allows client TP program 120 to identify a particular server location for the client, such that the client knows where to connect. In some embodiments, there are also resource definitions in a TP program that contain attributes concerned with communication. Such attributes may include, for example, a network end point identifier and unique TP identifier. These attributes are divided into attributes of a local TP program and attributes of a partner TP program with which it communicates. A local TP program refers to the program sending signals, and the partner TP program refers to the program receiving signals. Therefore, at various points in the process, client TP program 120 and server TP program 100 will, both, represent a local TP program and a partner TP program. A resource definition containing communication attributes of a local TP program is referred to as a connection definition. Communication attributes for a partner TP program are referred to as a listening service definition. Each type of definition also contains end point identifiers. An end point identifier is used to communicate with a potential partner region. Resource definitions each have a name which is unique within the namespace of a single TP program. Resource definitions may also include one or more of the following: a client applid, a server applid, IP address, and port. A model connection definition is used to define a network endpoint identifier of a cluster.

Server TP program 100 operates to communicate with client TP program 120 to establish a TP system to TP system connection. In some embodiments, server TP program 100 may use data that is written onto server TP program 100. In some embodiments, server TP program 100 may generate and forward unique TP identifiers, and other resource definitions, to a client device attempting to perform a transaction in hopes to obtain a secure connection between the client and server. In some embodiments, server TP program 100 may be a program designed for transactions occurring on a mobile device. In some embodiments, server TP program 100 may be a program designed for transactions occurring on an automated teller machine (ATM). In other embodiments, server TP program 100 may be a program designed for a traditional computing device, such as a desktop computer, PC, or laptop. In general, server TP program 100 may be any application or software that enables access to client TP program 120 over network 20. In the depicted embodiment, server TP program 100 resides on server 30. In other embodiments, server TP program 100, or similar programs, may reside on another server or another computing device, provided that server TP program 100 has access to server TP database 110 and client TP program 120 over network 20.

Server TP database 110 may be a repository that may be written and/or read by server TP program 100. In some embodiments, a program (not shown) may allow a web developer, administrator, or other user to define the data and write the defined data to server TP database 110. Data relevant to the communication of two TP programs, such as the communication between client TP program 120 and server TP program 100, may be stored to server TP database 110. For example, data relevant to the communication of two TP programs may include: a unique TP identifier, listening service definition, and/or model connection definition. In general, server TP database 110 may be any database capable of being monitored and accessed by server TP program 100.

Figure 2:
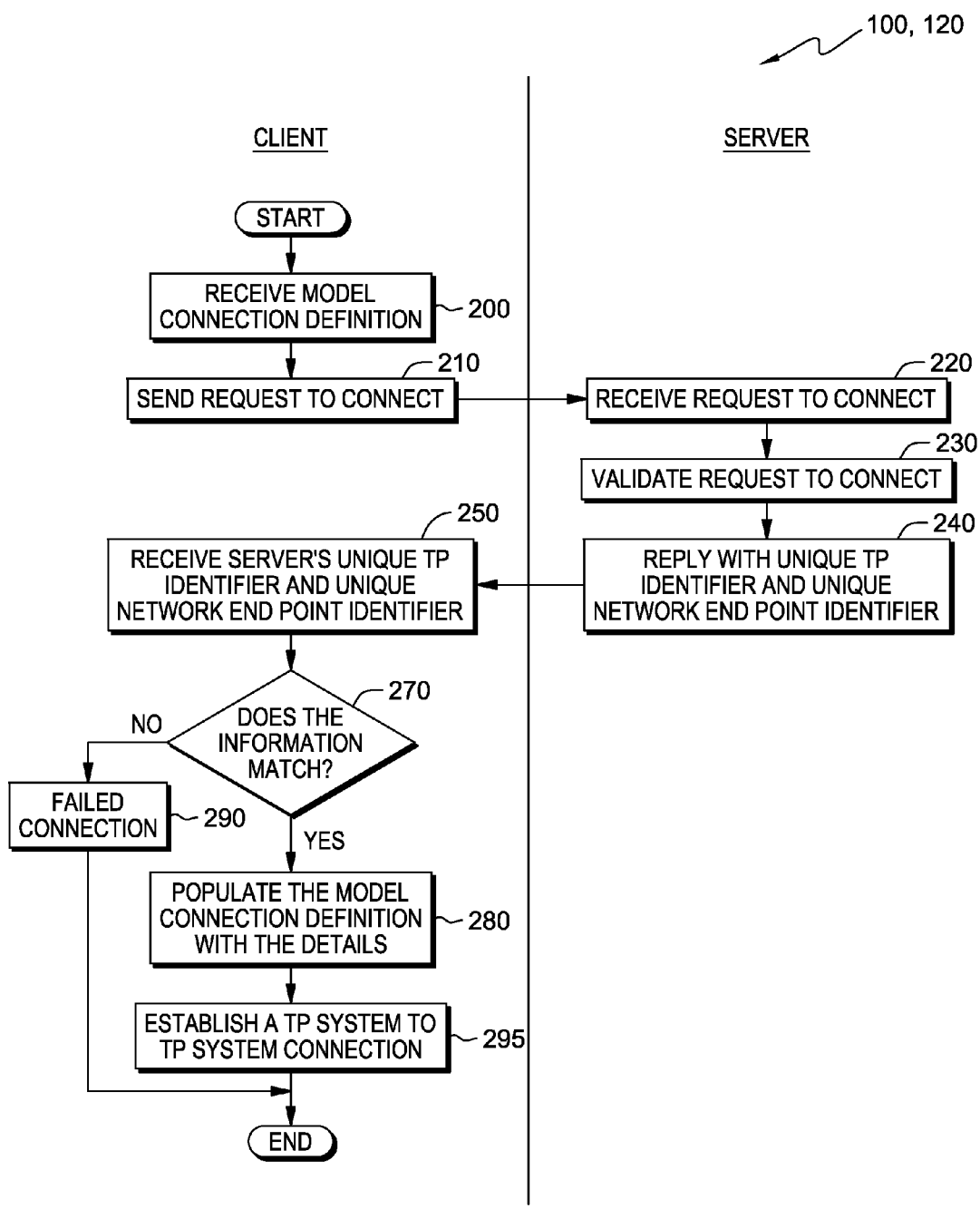
FIG. 2 depicts a flowchart of the steps of a client TP program interacting with a server TP program within a cluster, executing within the computing system of FIG. 1, for connecting a client TP program to a server TP program, in accordance with an embodiment of the present invention.

FIG. 2 depicts a flowchart of the steps of communication between client TP program 120 and server TP program 100, executing within the computing system of FIG. 1, in accordance with an embodiment of the present invention. Client TP program 120 and server TP program 100 operate to communicate and establish a TP system to TP system connection to provide end users with a service to execute transactions, in accordance with one embodiment of the present invention.

A set of TP programs provide end users with a service to execute transactions. These TP programs are divided into client TP programs, such as client TP program 120, and server TP programs, such as server TP program 100. A client TP program, such as client TP program 120, communicates directly with an end user. A server TP program, such as server TP program 100, executes application programs on behalf of end users. A transaction executed on behalf of an end user begins in client TP program 120, continues in server TP program 100 and completes in client TP program 120. Server TP programs are in a cluster, such that any one member of the cluster can perform the same service as another in the cluster. Each TP program has a unique identifier and network end point identifier. In embodiments of the present invention, connections exist for network communication between client TP program 120 and server TP program 100. Data transfer for communication between end points is handled by a separate subsystem that conforms to transmission control protocol/internet protocol (TCP/IP).

At the start, a user initiates a transaction that requires a secure connection. An example of this type of transaction could be a banking transaction or an airline reservation. In step 200, client TP program 120 receives a model connection definition to define a network end point identifier of a cluster. In some embodiments, client TP program 120 may receive a model connection definition to define a network end point identifier of a cluster from data stored onto client TP program 120. In some embodiments, client TP program 120 may retrieve a model connection definition to define a network end point identifier of a cluster from client TP database 130. The reception of a model connection definition may indicate the type of transaction the end user is wishing to pursue. For example, the end user may be initiating a banking transaction, airline reservation, or any other type of transaction that requires a secure connection.

In step 210, client TP program 120 sends a request to connect to a server TP program, such as server TP program 100, in a cluster using the cluster end point identifier. In some embodiments, the request is transmitted over network 20 via a TCP/IP network subsystem. In some embodiments, the cluster of server TP programs (e.g., server TP programs 100-1 through 100-n) may be a cluster of Customer Information Control System (CICS) transaction server (TS) regions.

The present invention ensures resilience of access to the cluster (e.g., server TP programs 100-1 through 100-n) as a whole, for both planned and unplanned outages of individual regions within the cluster. The present invention also supports the ability for client regions that have lost contact with a specific region within a cluster to reconnect back to the specific cluster region so that any unit of work affinities can be resolved. In some embodiments, the single end point of the cluster is managed by a connection balancing mechanism that spreads connectivity across the set of regions within a cluster. An example of achieving this includes TCP/IP port sharing; however, the present invention is not limited to the use of TCP/IP port sharing.

In step 220, server TP program 100 receives a request to connect to a client region to a server region within the cluster. This request is sent from client TP program 120.

In step 230, server TP program 100 validates the request to connect to client TP program 120. During the validation process, the general cluster end point of the cluster communicates with the specific end point of a particular server TP program 100-1 through 100-n within the cluster. More specifically, the request is intercepted and routed to a particular server TP program 100-1 through 100-n within the cluster. Once received, the particular server TP program 100-1 through 100-n within the cluster sends identifying information (e.g., a unique TP identifier and unique network end point identifier) to the general cluster end point.

In step 240, server TP program 100 replies to client TP program 120 with the unique TP identifier and unique network end point identifier of a particular server TP program 100-1 through 100-n within the cluster. In some embodiments, the response is transmitted over a TCP/IP network subsystem.

In step 250, client TP program 120 receives a unique TP identifier of a server TP program 100-1 through 100-n within the cluster and a unique network end point identifier. The unique TP identifier contains the applid, and the unique network end point identifier contains the name, port, and IP address. This information is used to allow client TP program 120 to recognize a particular server TP program 100-1 through 100-n within the cluster to establish a TP system to TP system connection.

In decision 270, client TP program 120 determines whether the information is a match or whether the information is not a match. To make this determination, client TP program 120 compares the received information against its model connection definition for server TP program 100. If client TP program 120 determines that the information does not match (decision 270, no branch), client TP program 120 will not connect to a server TP program, such as server TP program 100, causing a failed connection (step 290). In step 290, client program 120 sends a response to the end user, indicating the connection failed. If client TP program 120 determines that the information does match (decision 270, yes branch), client TP program 120 populates the model connection with the details of information related directly to the identity of a particular server TP program within the cluster (step 280). In step 280, this population of details allows there to be a possibility of connection between the client TP program, such as client TP program 120, and the server TP program, such as server TP program 100.

In step 295, client TP program 120 establishes a TP system to TP system connection with a server TP program, such as any of server TP programs 100-1 through 100-n, as indicated by the unique TP identifier. In some embodiments, the connection is made over a TCP/IP network subsystem.

Figure 3:
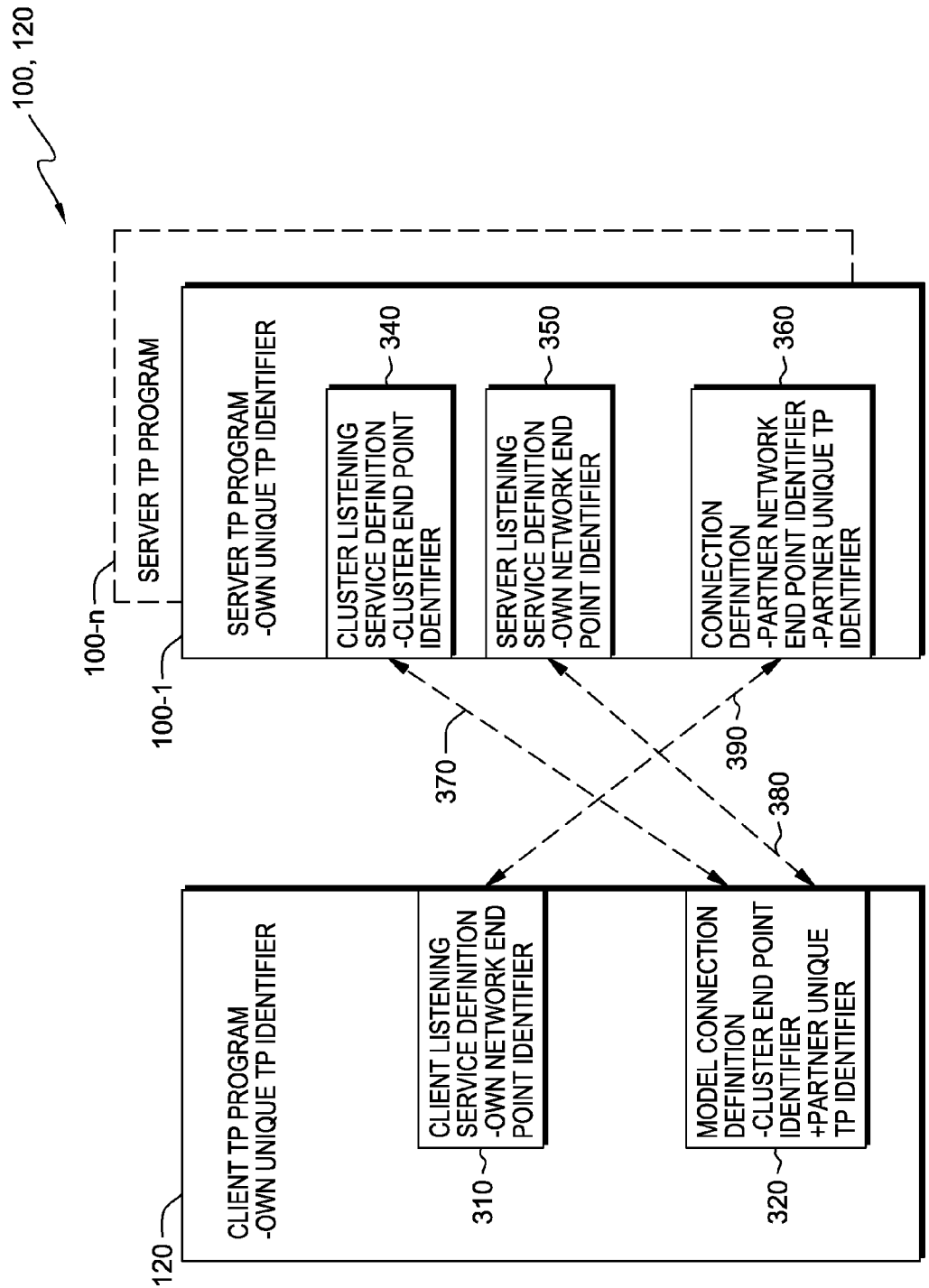
FIG. 3 depicts a schematic of the steps of a TP program, executing within the computing system of FIG. 1, for connecting a client TP program to a server TP program, in accordance with an embodiment of the present invention.

FIG. 3 depicts a schematic of the steps of communication between client TP program 120 and server TP program 100, executing within the computing system of FIG. 1, in accordance with an embodiment of the present invention. Client TP program 120 and server TP program 100 operate to communicate and establish a TP system to TP system connection to provide end users with a service to execute transactions, in accordance with one embodiment of the present invention.

In one embodiment, client listening service definition 310 and model connection definition 320 resides on client TP program 120. In one embodiment, client listening service definition 310 and model connection definition 320 resides on client TP database 130, as discussed in FIG. 1.

In one embodiment, cluster listening service definition 340, server listening service definition 350, and connection definition 360 resides on server TP program 100. In one embodiment, cluster listening service definition 340, server listening service definition 350, and connection definition 360 resides on server TP database 110, as discussed in FIG. 1.

In some embodiments, model connection definition 320 may be installed in storage main memory in the client system, such as client computing device 40, and may be populated with parameters. Such parameters may include: a cluster end point identifier and a partner unique TP identifier. Initially, model connection definition 320, in client computing device 40 is not complete and will not allow communication to any of server TP programs 100-1 through 100-n within the cluster. The applid of a cluster region is not defined within the model connection definition. Client TP program 120 includes a unique TP identifier for client TP program 120 and transmits cluster connect request message 370 to the cluster of server TP programs 100-1 through 100-n. This request is equipped with a cluster end point identifier. The cluster connection request is intercepted by the connection balancing mechanism being used, and is routed to a particular server TP program, such as any of server TP programs 100-1 through 100-n, within the cluster. The respective server TP program of server TP programs 100-1 through 100-n responds with cluster response message 380 which contains the applid, and other identity information, such as, the port and IP address, for the respective server region. In some embodiments, the cluster response message 380 is transmitted via TCP/IP network subsystem to client TP program 120. Model connection definition 320 in client TP program 120 is completed for subsequent communication with the particular server TP program, such as server TP program 100, within the cluster, using the applid for the client TP program, such as client TP program 120. The client TP program, such as client TP program 120, establishes TP system to TP system connection 390 with the server TP program, such as server TP program 100. In some embodiments, the connection is made over a TCP/IP network subsystem.

Figure 4:
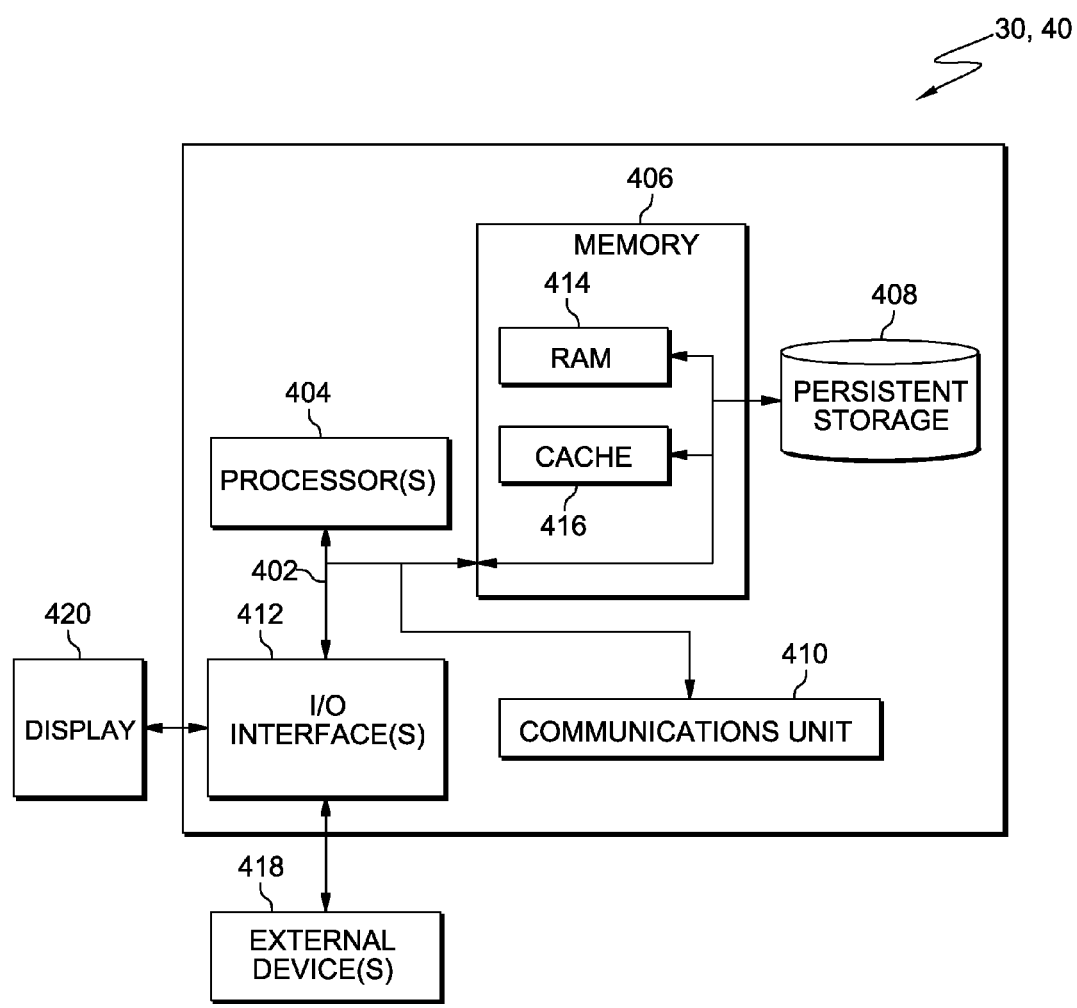
FIG. 4 depicts a block diagram of components of the server and the client computing device, in accordance with an embodiment of the present invention.

FIG. 4 depicts a block diagram of components of server 30 and client computing device 40, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Sever 30 and client computing device 40 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Server TP program 100 and server TP database 110 are stored in persistent storage 408 of server 30 for execution and/or access by one or more of the respective computer processors 404 of server 30 via one or more memories of memory 406 of server 30. Client TP program 120 and client TP database 130 are stored in persistent storage 408 of client computing device 40 for execution by one or more of the respective computer processors 404 of client computing device 40 via one or more memories of memory 406 of client computing device 40. In this embodiment, persistent storage 408 includes a magnetic hard disk drive. Alternatively, or in addition to magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Server TP program 100 and server TP database 110 may be downloaded to persistent storage 408 of server 30 through communications unit 410 of server 30. Client TP program 120 and client TP database 130 may be downloaded to persistent storage 408 of client computing device 40 through communications unit 410 of client computing device 40.

I/O interface(s) 412 allows for input and output of data with other devices that may be connected to server 30 or client computing device 40. For example, I/O interface 412 may provide a connection to external device(s) 418, such as keyboard, keypad, a touch screen, and/or some other suitable input device. External device(s) 418 can also include portable computer-readable storage media (e.g., thumb drives, portable optical or magnetic disks, and memory cards). Software and data used to practice embodiments of the present invention, e.g., server TP program 100 and server TP database 110, can be stored on such portable computer-readable storage media and can be loaded onto persistent storage 408 of server 30 via I/O interface(s) 412 of server 30. Software and data used to practice embodiments of the present invention, e.g., client TP program 120 and client TP database 130, can be stored on such portable computer-readable storage media and can be loaded onto persistent storage 408 of client computing device 40 via I/O interface(s) 412 of client computing device 40. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for connecting an access point in a client to an access point within a cluster of servers for a transaction process, the method comprising:
    transmitting from a client, by one or more processors, a connect request to a cluster of servers sharing a first network end point identifier, wherein a connection balancing mechanism reroutes the connect request to a second end point identifier corresponding to a specific server within the cluster of servers;
    receiving at the client, by one or more processors, a model connection definition, wherein the model connection definition indicates the type of transaction initiated by an end user, wherein an incomplete model connection definition is not specific within the cluster of servers and will not allow communication to the specific server within the cluster of servers, and wherein a populated model connection definition is specific to the specific server;
    receiving at the client, by one or more processors, connection information, wherein the connection information allows the client to connect to the specific server within the cluster of servers, and wherein the connection information includes, at least: a server application identifier (applid), a second name that is unique within a second namespace of the specific server, and the second network end point identifier corresponding to the specific server within the cluster of servers;
    populating, by one or more processors, the model connection definition with, at least, the connection information, a client applid, a first name that is unique within a first namespace of the client, and the first network end point identifier;
    connecting, by one or more processors, the client to the specific server within the cluster of servers;
    determining, by one or more processors, the client has lost connection with the specific server within the cluster of servers; and
    reconnecting, by one or more processors, back to the specific server within the cluster of servers so that any unit of work affinities can be resolved, wherein a resilience of access to the cluster is provided for both planned and unplanned outages of the specific server within the cluster of servers, wherein outages occur when the specific server becomes unavailable to the client.

2. The method of claim 1, wherein the cluster of servers is a cluster of Customer Information Control System (CICS) transaction servers (TS).

3. The method of claim 1, wherein the connection balancing mechanism spreads connectivity across the cluster of servers.

4. The method of claim 3, wherein the connection balancing mechanism is TCP/IP port sharing.

5. The method of claim 1, further comprising:
    comparing, by one or more processors, the connection information to the model connection definition; and
    determining, by one or more processors, that the connection information matches the model connection definition.

6. A method comprising:
    identifying, by one or more processors, by a transaction processing client (TP client), a model connection definition for a cluster of transaction processing servers (TP servers) sharing a first network endpoint;
    transmitting, by one or more processors, by the TP client, a connection request to the first network endpoint of the cluster of TP servers, wherein a connection balancing mechanism responds to the connection request by selecting a second unique network end point identifier corresponding to a specific server within the cluster of servers;
    receiving, by one or more processors, by the TP client, connection information configured to allow the TP client to connect to the specific server, wherein the connection information includes, at least; the second unique network end point identifier, a server application identifier (applid), and a second name that is unique within a second namespace of the specific server;
    comparing, by one or more processors, by the TP client, the connection information to the model connection definition;
    in response to determining, by one or more processors, based on the comparison, that the model connection definition matches the connection information, populating, by one or more processors, the model connection definition with the connection information, a client applid, a first name that is unique within a first namespace of the client, and the first network endpoint, and establishing, by one or more processors, a connection between the TP client and the specific TP server based on the populated model connection definition, wherein an incomplete model connection definition is not specific within the cluster of TP servers and will not allow communication to the specific TP server, and wherein the populated model connection definition is specific to the specific TP server;

in response to determining, by one or more processors, based on the comparison, that the model connection definition does not match the connection information, failing, by one or more processors, to establish a connection between the TP client and the specific TP server; and sending, by one or more processors, a response to a user, wherein the response includes an indication of the failure to establish the connection between the TP client and the specific TP server.

* * * * *